United States Patent [19]

Matsuura et al.

[11] Patent Number: 5,201,034
[45] Date of Patent: Apr. 6, 1993

[54] INTERACTIVE INTELLIGENT INTERFACE

[75] Inventors: Masayoshi Matsuura, Hitachi; Hiroyuki Ogura, Yokohama; Yuko Teranishi, Koganei; Akito Yamanaka, Akashi; Shinobu Wada, Kawasaki; Masayuki Orimo; Katsumi Kawano, both of Kawasaki; Yasuo Suzuki, Ebina; Kinji Mori, Yokohama, all of Japan

[73] Assignees: Hitachi Ltd.; Hitachi Information and Control System Inc., Tokyo, Japan

[21] Appl. No.: 856,804

[22] Filed: Mar. 24, 1992

Related U.S. Application Data

[63] Continuation of Ser. No. 413,455, Sep. 27, 1989, abandoned.

[30] Foreign Application Priority Data

Sep. 30, 1988 [JP] Japan .................. 63-244130

[51] Int. Cl.⁵ .......................................... G06F 15/20
[52] U.S. Cl. ...................................... 395/155; 395/161
[58] Field of Search .............................. 395/155–161, 395/156; 434/307, 316

[56] References Cited

U.S. PATENT DOCUMENTS 3,984,923  10/1976  Rawson et al. ............... 434/316
4,012,848  3/1977  Diament et al. ............... 434/307

OTHER PUBLICATIONS

Business Communication, vol. 19, No. 6, 1982, pp. 58–63. An English translation is unavailable to applicants' attorney.

Primary Examiner—Heather R. Herndon
Attorney, Agent, or Firm—Fay, Sharpe, Beall, Fagan, Minnich & McKee

[57] ABSTRACT

An interactive intelligent interface in a system which performs an interactive processing making the system recognize the capacity of a user of the system. The system has a function of providing a processing method conformable to the recognized capacity of the system user, whereby a processing method to be performed by the system is changed in accordance with the operating or processing capacity of the system user so that a procedure desired by the system user can be performed irrespective of the operating or processing capacity of the system user.

19 Claims, 12 Drawing Sheets

FIG. 1A

VISUAL ACUITY 1.0

```
SECRET NUMBER
    ****
AMOUNT OF MONEY
TO BE DRAWN
  235000
```

0 1 2 3 4 5 6 7 8 9

- CONFIRMED (9)
- TEN THOUSAND (8)
- THOUSAND (7)

INTERACTIVE INTELLIGENT INTERFACE

This is a continuation of copending application(s) Ser. No. 07/413,455 filed on Sep. 27, 1989 now abandoned.

BACKGROUND OF THE INVENTION

The present invention relates to an interactive intelligent interface in an information processing system by which the system can flexibly cope with the physical handicaps of a user client of the system.

In the conventional interactive intelligent interface, a system user (or a client) operates a system (or a server) in accordance with some operating procedures defined in the system, see for example, BUSINESS COMMUNICATION, Vol. 19, No. 6 (1982), pp. 58-63. In the operating procedures taught by this prior art, only a system user having a sufficient capacity (or ability) to operate the system can perform a desired procedure. Therefore, problems when users have insufficient capacity to operate the system. For example, user may need a lot of time for performing a desired procedure. Also, if a system user who desires to utilize a CD (cash dispenser) is not suited to physical requirements of the system including the possession of a stature not smaller than a predetermined value, a visual acuity not lower than a predetermined value and an ability to operate a touch sensor switch, the system user cannot enjoy service from the CD.

SUMMARY OF THE INVENTION

An object of the present invention is to provide an interactive intelligent interface by which processing methods to be performed by a system is changed in accordance with the particular operating capacity of an individual user or the particular processing capacity of a machine user. This invention allows a procedure desired by the system user to be performed irrespective of the operating or processing capacity of the system user. In other words, the object of the present invention is to provide an interface by which a system can provide a processing method suited to or compatible with the particular capacity of a user.

To that end, the present inventions and an interactive intelligent interface which performs interactive processing allowing the system to recognize and cope with the capacity of a user and modifying the system's functioning to provide a processing method compatible with the recognized capacity of the system user.

Given the above-mentioned construction of the present invention, the system provides a processing method compatible with to the operating or processing capacity of the user. Since the system user can perform a desired procedure in accordance with the processing method provided by the system, the intended procedure can be accomplished irrespective of the operating or processing capacity of the user. Namely, the system user can make a request to the system without regard to his or her own particular capacity.

DESCRIPTION OF THE PREFERRED EMBODIMENTS

A visual interface as a first embodiment of the present invention will now be explained which recognizes the visual acuity of a user of a system and which provides a processing method conformable to the visual acuity of the system user. The following embodiments will be explained in conjunction with the situation where the present invention is applied to a CD (cash dispenser).

Figure 1A:
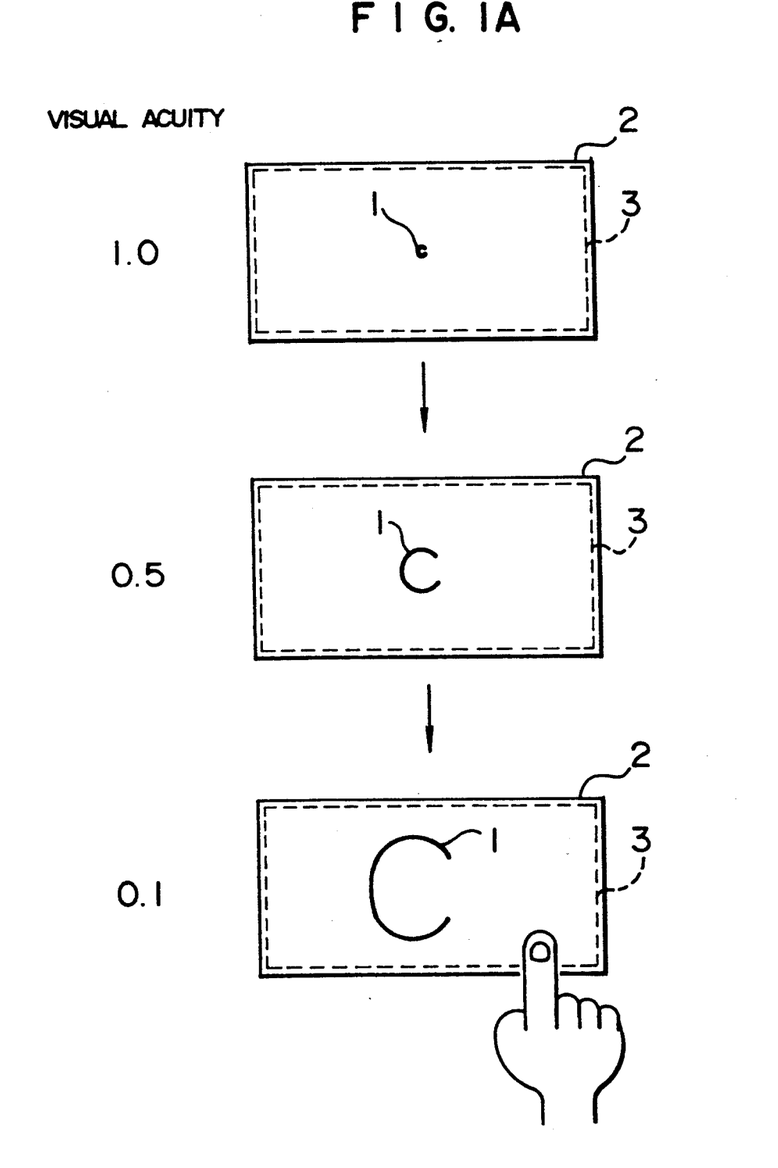
FIG. 1A is a view representing a zooming-up operation used in determining the visual acuity and represents the first embodiment of the present invention.
Figure 3:
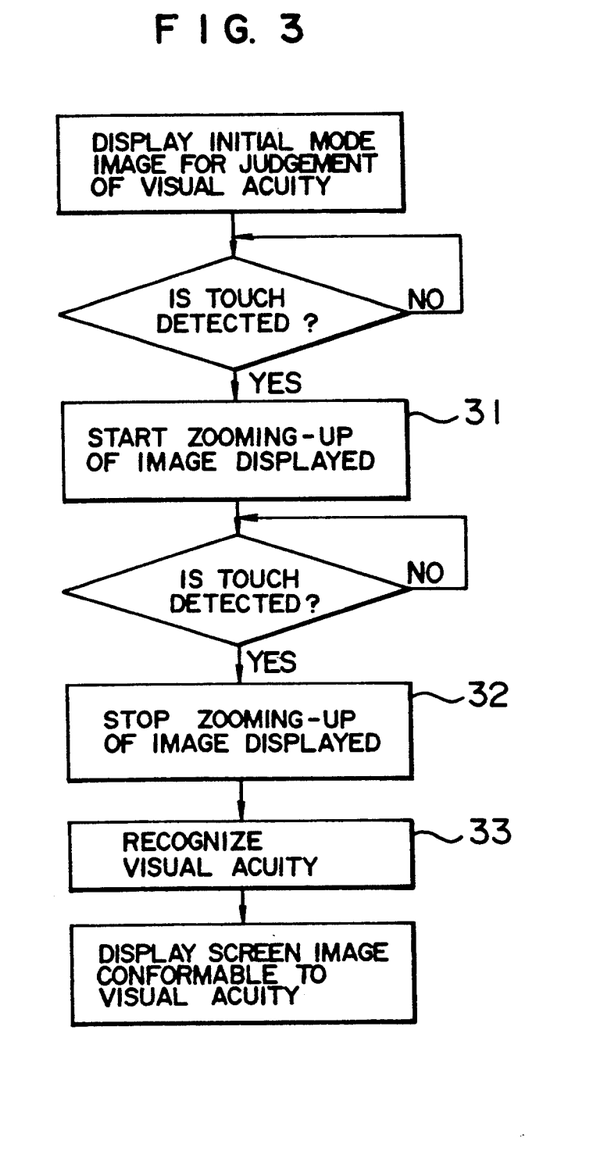
FIG. 3 is a flow chart for explaining an interactive processing shown by FIG. 1A.

First, a visual acuity recognizing or measuring method shown in FIG. 1A will be explained in reference to FIG. 3. On display 2 a symbol is displayed for recognizing the visual acuity of a system user; for example, a picture 1 representing a partly-cut ring or a character "C". A touch sensor 5 for measurement of the visual acuity is provided 3 on the display 2. When the system detects the first touch of the system user on the display 2 by virtue of the touch sensor 3, the zooming-up of the character "C" 1 is started (step 31 in FIG. 3). When the system detects the second touch on the display, the zooming of the character "C" 1 is stopped (step 32 in FIG. 3). The system recognizes the visual acuity of the system user on the basis of the size of the character "C" 1 at the point of time when the zooming is stopped (step 33 in FIG. 3).

Prior to use of the system, the system user looks at the picture displayed on the display 2. If the system user can judge the displayed picture as being a character "C" 1, the system user touches the display 2 twice for a short time.

On the other hand, if the system user cannot judge the displayed picture as being the character "C", the system user touches the display 2 once. In response to this first touch, the zooming-up of the character "C" 1 is started. At the point of time when the system user can judge the picture as being the character "C", the system user touches the display 2 again. In response to this second touch, the zooming of the character "C" 1 is stopped.

Figure 1B:
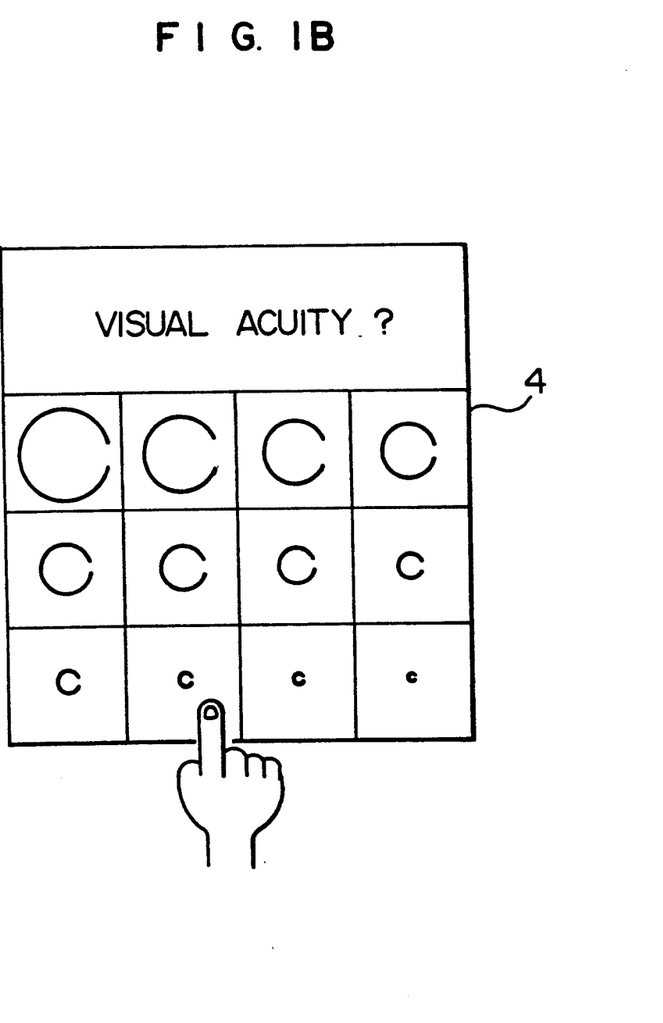
FIG. 1B is a view concerned with the first embodiment representing a series of symbols used for visual acuity testing.

Another method of recognizing the visual acuity is shown in FIG. 1B. Characters "C" having variant sizes are displayed on a display 4. The system user touches the smallest one of the characters which the user can judge as being "C". The system recognizes the visual acuity of the system user in accordance with the size of the character "C" touched by the user.

Next, an operating method conformable to the visual acuity of the system user recognized by the system will be explained conjunction with the cash dispenser taken as an example.

Figure 2A:
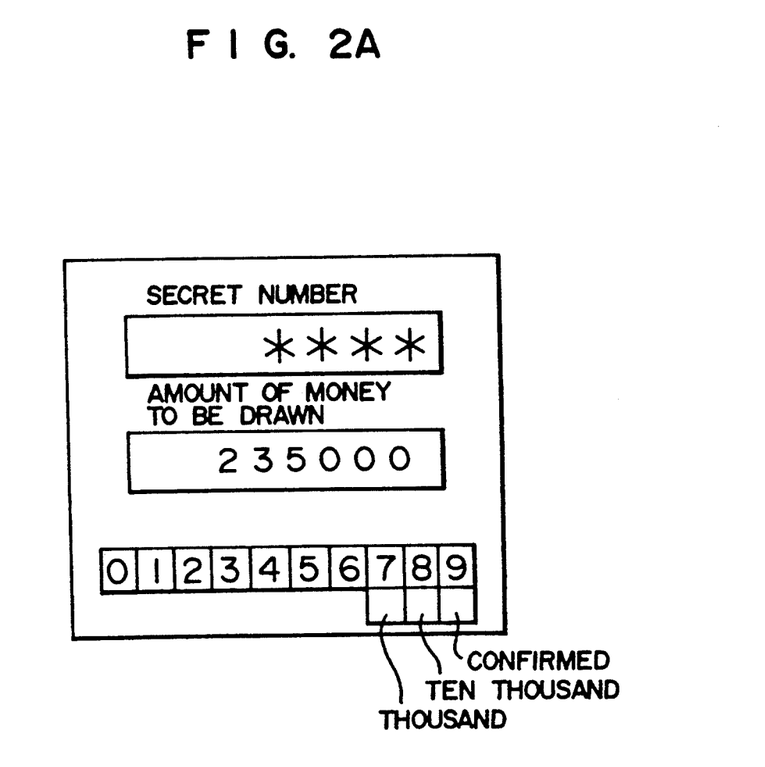
FIG. 2A is a view concerned with the first embodiment showing an operating method conformable to a system user having a relatively excellent visual acuity.

FIG. 2A shows an operating method conformable to a system user having a relatively excellent visual acuity. The system user inputs a secret number (****) and the amount of money to be drawn (235000) onto one display screen.

Figure 2B:
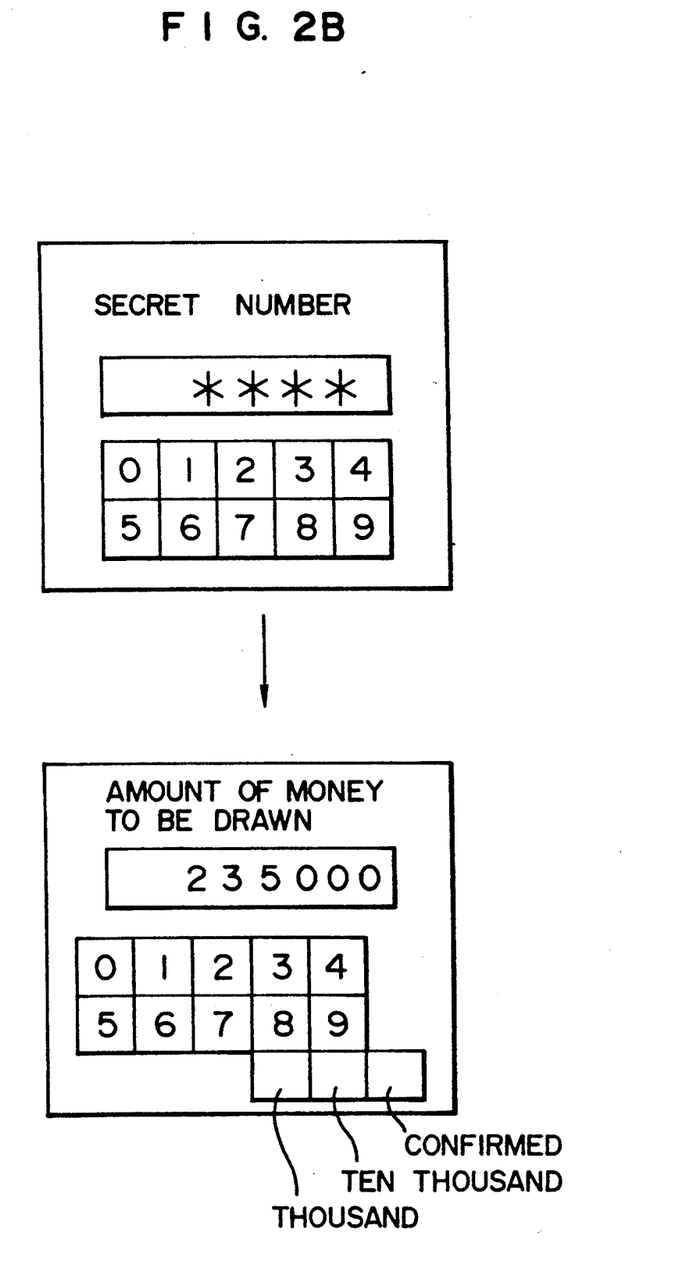
FIG. 2B is a view concerned with the first embodiment showing an operating method conformable to a system user having a relatively poor visual acuity.

FIG. 2B shows an operating method conformable to a system user having a relatively poor visual acuity. First, the system user inputs a secret number (****) onto a display screen on which an enlarged image is displayed. Thereafter, the system user inputs the amount of money to be drawn (235000) onto the next display screen.

In the first embodiment as mentioned above, the inputting of the secret number and the inputting of the amount of money to be drawn are primary work to be conducted between the system and the system user. Information concerning the secret number and information concerning the amount of money to be drawn constitute a first kind of information. Information concerning the zooming-up and information concerning the detection of touch are auixliary information for judging the operating or processing capacity of the system user and constitute a second kind of information. Information concerning the stoppage of zooming-up is information for estimating the operating or processing capacity of the system user and constitutes a third kind of information.

Next, an explanation will be made of embodiments for coping with a system user who cannot perform a desired procedure using the interface shown by the first embodiment.

Figure 4:
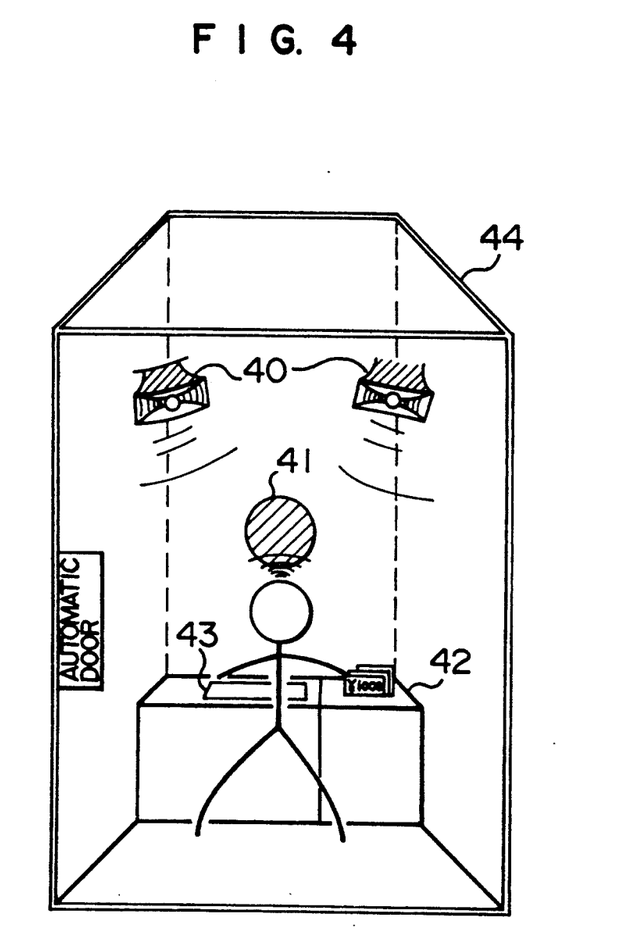
FIG. 4 is a view showing the overall physical construction of an interactive processing system where responses are made using the visual sense and auditory sense and represents the second embodiment of the present invention.

A second embodiment of the present invention will now be explained which includes a visual and auditory interface and which is implemented using visual information as well as auditory information. FIG. 4 shows equipment in which a procedure for accomplishing an intended purpose is performed. The equipment is housed with a sound proof room 44 in order to shut off noises from the exterior of the equipment and to prevent any voice or sound in the room from leaking to the exterior.

When a user of the equipment is outside the equipment, the user receives a message from the equipment. If the equipment is in use, a message informing this fact is imparted and the user waits until the equipment becomes unoccupied. When the equipment is in an unoccupied condition, a guidance message for use of the equipment is imparted and the user of the equipment enters the equipment. The equipment is installed with a speaker 40 for transmitting a message from the equipment to the user, a microphone 41 for recognizing a response from the user to a message from the system, a device 42 for outputting money to the user, and a display 43 onto which inputting can be made by virtue of a touch sensor.

In the case where the user of the equipment cannot recognize an image or character on the display 43 even under the maximum zooming-up condition, the equipment imparts or signifies a message informing that interactive processing will be performed relying on the speaker 40 and the microphone 41. The user of the equipment makes an interactive conversation with the equipment through the speaker 40 and the microphone 41. When the procedure desired by the user has been completed, the equipment guides the user by imparting from the speaker 40 a message giving detailed explanation of the position money for the user and outputted from the equipment.

Figure 9:
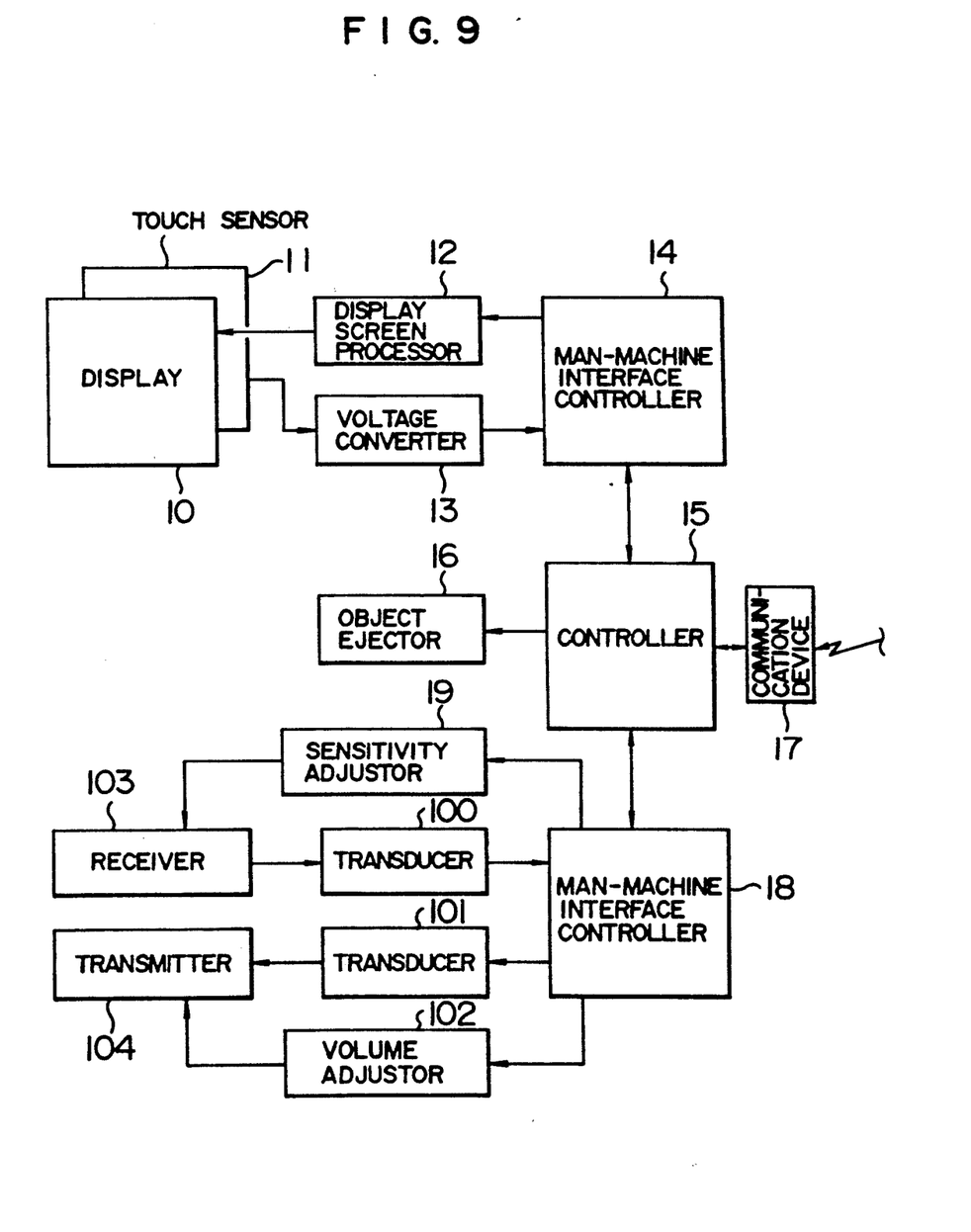
FIG. 9 is a view showing the construction of an apparatus for realizing the visual sense and auditory interface which is the second embodiment.
Figure 10A:
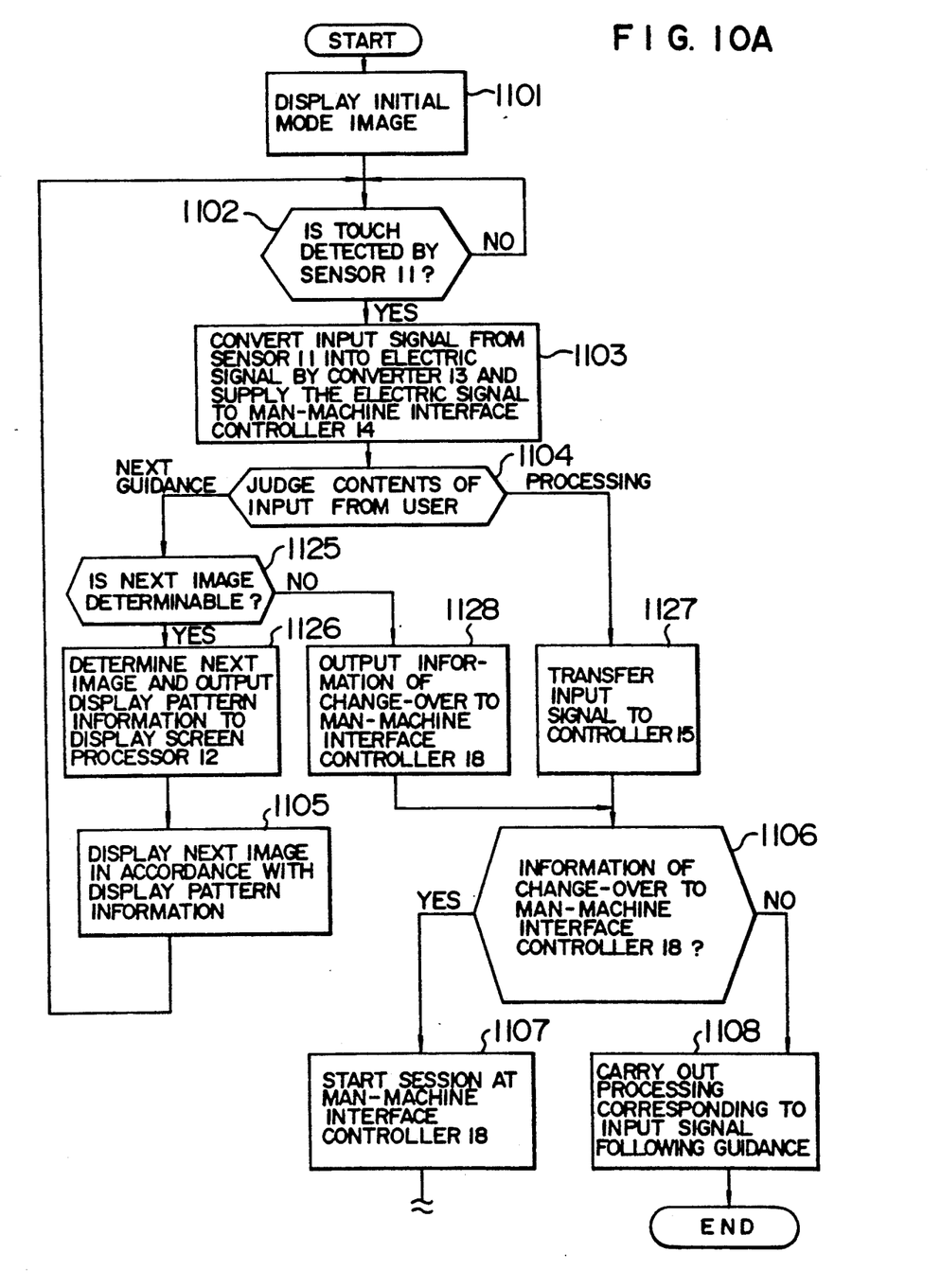
FIGS. 10A and 10B show flow charts for explaining a processing made in the interface of the second embodiment.

The contents of a processing made in the second embodiment will be explained in detail by virtue of FIGS. 9, 10A and 10B. FIG. 9 is a view showing the internal construction of an apparatus which realizes the second embodiment. A display 10 and a touch sensor 11 are materialized by a display with touch sensor as explained in conjunction with the first embodiment. A man-machine interface controller 14 is provided for controlling a man-machine interface processing shown by the first embodiment or a visual interface in the second embodiment. The controller 14 receives an input from the touch sensor 11 through a voltage converter 13 to output screen image information to the display 10 through a display screen processor 12. A man-machine interface controller 18 is provided for controlling an auditory interface in the second embodiment. The man-machine interface controller 18 receives an input of the user from a receiver 103 (corresponding to the microphone 41 in FIG. 4) through a transducer 100 and supplies a guidance or the like for the user to a transmitter 104 (corresponding to the speaker 40 in FIG. 4) through a transducer 101. The man-machine interface controller 18 also operates to adjust the sensitivity of the receiver 103 and the sound volume of the transmitter 104 by virtue of a sensitivity adjustor 19 and a volume adjustor 102, respectively. A controller 15 is provided for controlling the output of money to the user through an object ejector 16 in accordance with a demand from the user received by the man-machine interface controllers 14 and 18, and reporting the contents of the processing to a host computer (not shown) through a communication device 17.

Next, a flow of the processing made in the second embodiment will be explained in reference to FIGS. 10A and 10B. FIG. 10A is a view showing the processing made by the man-machine interface controller 14 shown in FIG. 9 An initial mode image, that is, an image or picture used for judging the visual acuity as shown in the first embodiment is displayed on the display 10 (step 1101). A user of the equipment starts the use of the equipment by touching the display screen. The touch of the user onto the display screen is detected by the touch sensor 11 (step 1102) and is converted by the voltage converter 13 into an electric signal which in turn is supplied to the man-machine interface controller 14 (step 1103). The man-machine interface controller 14 judges a request of the user in accordance with an image being displayed and a signal inputted from the sensor 11 (step 1104). In the case where the input from the user requests the next guidance, a judgement is made as to whether an image to be displayed next (for example, an image for zooming-up) is determinable (or is to be prepared) (step 1125). When the next image is determinable, information concerning the next image is outputted to the display screen processor 12 (step 1126). In accordance with this information, the display screen processor 12 causes the display 10 to display the next image (step 1105). On the other hand, when the next image is not determinable at step 1125 (for example, when a character having a size which is recognizable by the user of the equipment but yet cannot be displayed), the man-machine interface controller 14 outputs to the controller 15 a message for change-over to the man-machine interface controller 18 since an interface suitable for the user of the equipment cannot be provided by the man-machine interface controller 14 (step 1128). In the case where the step 1104 determines that the input from the user requests a processing to be performed by the controller 15 such as the outputting or ejection of an object from the equipment, that is, the input from the user is an input signal following a guidance, the input signal is transferred to the controller 15 (step 1127). The controller 15 judges whether or not a signal supplied from the man-machine interface controller 14 is the signal for change-over to the man-machine interface controller 18 (step 1106). In the case of the change-over signal, the control is entrusted to the man-machine interface controller 18 (step 1107). On the other hand, in the case of the input signal following the guidance, a processing corresponding to the input signal is performd (step 1108).

Figure 10B:
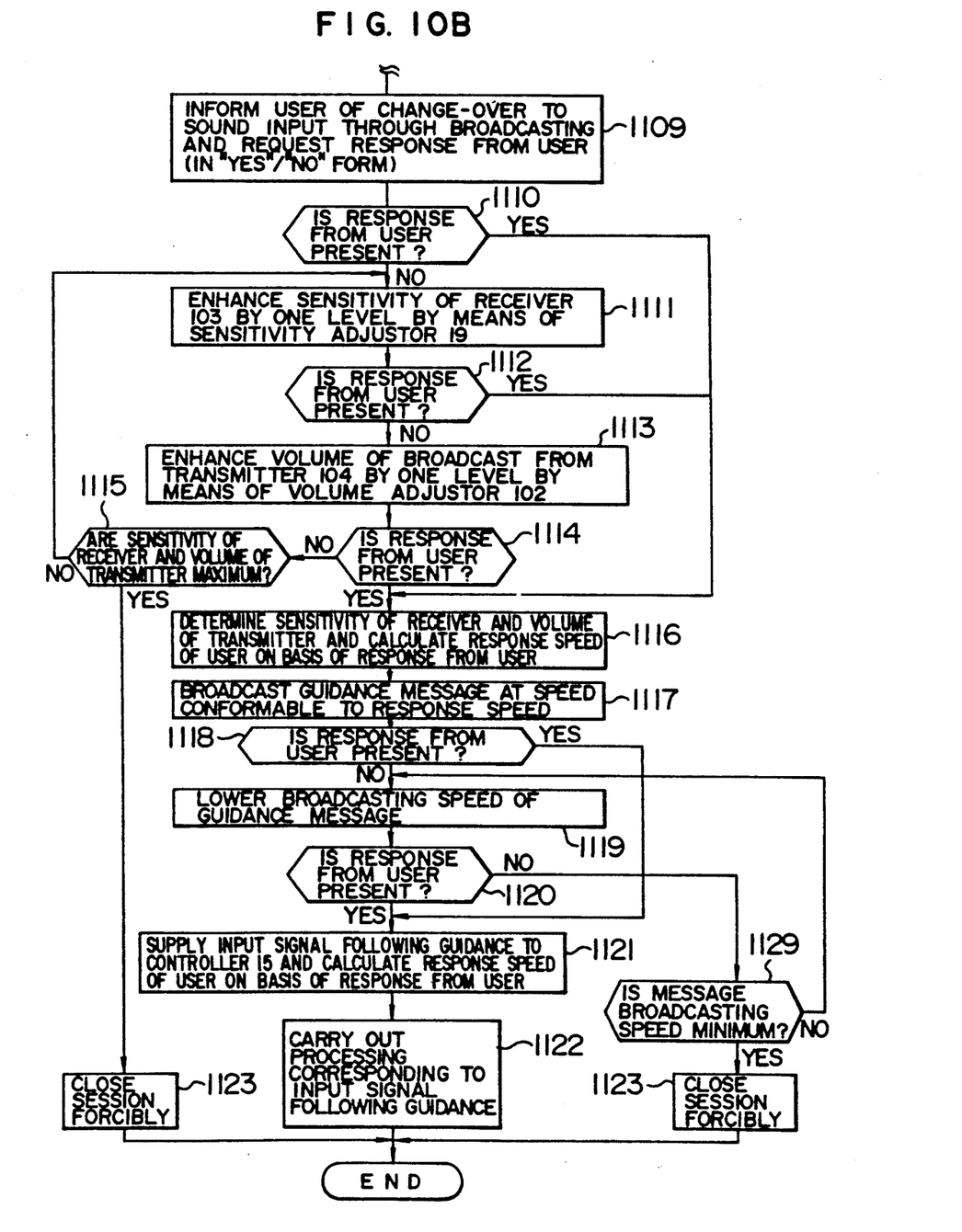

FIG. 10B is a view showing the flow of the processing performed by the man-machine interface controller 18. First, the man-machine interface controller 18 broadcasts the change-over of an input interface to a sound or voice input using the receiver 104 (see FIG. 9) and waist for a response from the user of the equipment (step 1109). In step 1110, a judgement is made as to whether there is a response from the user in a predetermined period of time. In the case where there is a response from the user, the flow proceeds to a processing step 1116. On the other hand, in the case where there is no response from the user, the sensitivity of the receiver 103 is enhanced by one step or level by means of the sensitivity adjustor 19 (step 1111). The man-machine interface controller 18 waits for a response from the user again or judges whether there is a response from the user (step 1112). In the case where the step 1112 determines the presence of a response from the user, the flow proceeds to the processing step 1116. In the case where the step 1112 determines the absence of a response from the user, the volume of the broadcast from the transmitter 104 is enhanced by one level by means of the volume adjustor 102 and the broadcast is made again (step 1113). The man-machine interface controller 18 waits for a response from the user again or judges whether there is a response from the user (step 1114). The above steps 1111 to 1114 are repeated until a response from the user is obtained. If in this repeating cycle the sensitivity of the receiver becomes the maximum and the volume of the transmitter becomes the maximum, the cycle is terminated (step 1115) and the session with the user is closed (step 1123). In the case where the step 1114 determines the presence of a response from the user, the sensitivity of the receiver and the volume of the transmitter established at that point of time are determined as set values to be used in the subsequent steps and a response speed of the user is determined by measuring the time it took for the user to give the response in the above-mentioned processing (step 1116). Next, a guidance message for progression of the session is broadcasted at a speed conformable to the response speed determined at the step 1116 (step 1117) and the man-machine interface controller 18 waits for a response from the user or judges whether there is a response from the user (step 1118). In the case of the presence of a response from the user, the flow proceeds to a processing step 1121 in which an input signal following the guidance is supplied to the controller 15 which in turn performs a processing corresponding to the input signal (step 1122). On the other hand, in the case of the absence of a response from the user at the step 1118, the broadcasting speed of the guidance message is lowered (step 1119) and the man-machine interface controller 18 waits for a response from the user (step 1120). The steps 1119 and 1120 are repeated until a response from the user is obtained. If in this repeating cycle the message broadcasting speed reaches the minimum value (step 1129), the session with the user is closed (step 1123). In the case where the step 1120 determines the presence of a response from the user, the flow proceeds to the steps 1121 and 1122.

Figure 5:
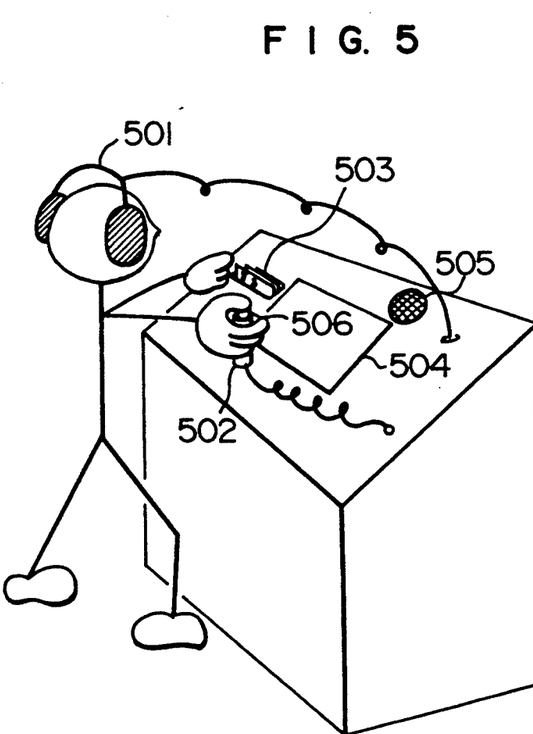
FIG. 5 is a view showing the overall physical construction of an interactive processing system used in an auditory interface represents the third embodiment of the present invention.

A third embodiment of the present invention will now be explained which comprises an auditory interface by which an interactive processing is performed in accordance with auditory information. FIG. 5 is a view showing an apparatus by which a procedure for accomplishing a purpose is performed in accordance with auditory information. Equipment is provided with a sound receiver 501 (hereinafter referred to as headphone) for imparting or signifying a message from the equipment, a responder 502 (hereinafter referred to as handy stick) for receiving a response from a user of the equipment to a message, a device 503 for outputting from the equipment an object the right of reception of which has been acquired by the user as a result of completion of the procedure, a display 504 with touch sensor as explained in conjunction with the first embodiment and a speaker 505 for imparting a message which informs of change-over to a mode for use of headphone.

In the following, the third embodiment will be explained using a cash dispenser as an example.

In the case where a user of the equipment cannot recognize a displayed picture or image even under the maximum zooming-up condition explained in conjunction with the first embodiment, the equipment imparts a message informing of the use of the headphone 501 and the handy stick 502 and explains the positions where the headphone 501 and the handy stick 502 are located.

The user of the equipment puts the headphone 501 on the head and grasps the handy stick 502. The inputting of a secret number by the user is requested from the equipment through the headphone 501. The user inputs to the equipment a signal corresponding to the secret number by means of the handy stick 502. For example, when the secret number is "1234", the user depresses a switch 506 of the handy stick 502 once. In response to the depression, an acknowledgement is transmitted from the equipment through the headphone 501. Next, the user depresses the switch 506 of the handy stick 502 twice and an acknowledgement signal is outputted from the equipment in response to the two depressions. By repeating a similar operation, the secret number is inputted. In the case where the secret number is erroneously inputted, a similar processing is done over again from the beginning.

Next, the equipment requests to input the amount of money to be drawn. The equipment signifies through the headphone 501 the minimum value or unit of the highest digit of the amount of money which the user desires to withdraw. This is signified in order starting from one thousand (for example, in order from one thousand, ten thousand, hundred thousand, million, ten million, hundred million, - - -). When the minimum value of the highest digit of the amount of money to be drawn is signified, the user depresses the switch 506 of the handy stick 502. For example, if the amount of money to be drawn is 235000 yens, the user depresses the switch 506 when "hundred thousand" is signified from the equipment. Thereafter, in a similar manner to the inputting of the secret number, the user inputs the amount of money to be drawn in order starting from the number at the highest digit (for example, in order of "2", "3" and "5" with the amount of money to be drawn is 235000 yens).

In the second and third embodiments, if a response from the user to a message imparted from the equipment for performing an interactive processing is absent for a predetermined period of time, the equipment judges the volume of the speaker as being improper to the user. In the case of the second embodiment, the volume of the speaker is enhanced within a permitted range of volume until a response from the user is obtained. In the case of the third embodiment, the sound volume of a message given upon change-over to the mode for use of headphone is enhanced within a permitted range of volume until a response from the user is obtained. Further messages for an interactive processing are given with this volume.

Figure 6:
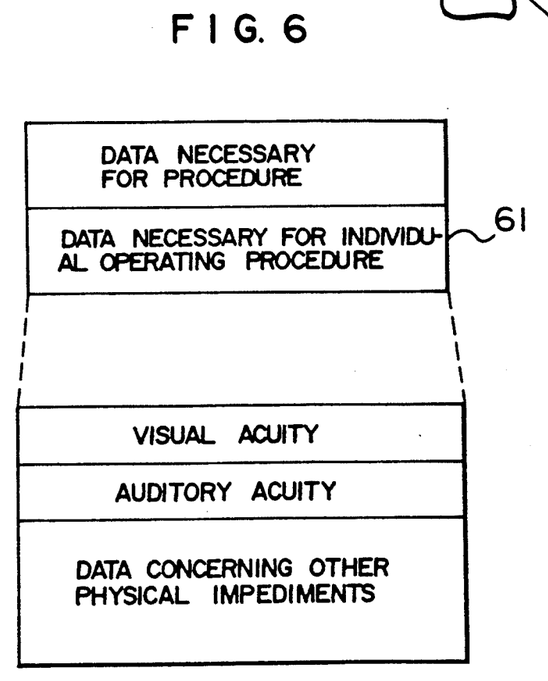
FIG. 6 is a view showing a medium in which data concerning physical impediments of a system user is registered.

FIG. 6 shows a medium 61 in which the capacity of a particular user of a system or equipment has been previously registered. In the case where this medium is used, the procedure for recognition of the capacity of a user or individual as explained in conjunction with the first to third embodiments can be omitted. The system recognizes the capacity of the system user on the basis of data registered in the medium 61 and the system user performs a desired procedure in accordance with the stored individual.

With the method mentioned above, a system for interactively advancing a processing can recognize the capacity of a user of the system and can take measurements conformable to the recognized capacity. Therefore, the system user can operate the system easily to accomplish a desired procedure.

The first to third embodiments have been explained in conjunction with a cash dispenser taken as an example. However, the present invention is not limited to the cash dispenser. The present invention is applicable to any system which performes a processing through an interactive conversation with a user of the system.

The first to third embodiments have been explained in conjunction with the case where the visual acuity of auditory acuity of a user of a system is automatically judged on the basis of a response from the system user and a processing method conformable to the capacity of the system user is provided. However, the capacity or condition of the system user as will be mentioned hereinbelow can be further recognized in accordance with the response from the system user.

Referring to the zooming-up method explained in conjunction with the first embodiment, when a response from a system user is absent even under the maximum zooming-up condition, it can be presumed that the user failed to stop the zooming though the user could recognize a displayed symbol. Two measures will be mentioned which can be considered for coping with such a case.

(i) The system provides to the system user a simple operation for, confirming whether the replay of zooming should be made. If the replay of zooming is requested from the user, the system performs the zooming-up again, this time at a lowered speed. In the case where a response from the user is present upon zooming-up at the lowered speed, the system calculate the ratio of the lowered zooming speed to the usual zooming speed so that a processing method in which the operation speed as well as the visual acuity of the user are taken into consideration is provided to the user.

(ii) The system is provided with a function by which operations for the start and stoppage of zooming can be effected by either a touch sensor or a voice recognition. Namely, the user responds by touching display or inputting a voice. When the voice is inputted as the response, the system provides the system user with a processing method in which a message informing when the voice response should be in addition to displaying an image conformable to the visual acuity of the user.

The next explanation includes the situation where the rate of response of a system user to a processing method provided by a system in accordance with the user's operating capacity recognized by the system is low.

When the number of erroneous operations of the user exceeds a certain value, the system gives a message providing detailed explanation of an alternative procedure of operation. In the case where erroneous operation continues, a message informing of procedure alternation is given to the user and the procedure of operation is altered. An example of a processing method provided after alteration is when the alteration is made with the information input system (for example, a touch sensor input system) being kept. In this example, the operation to be made for one interactive conversation is simplified though the number of interaction between the system and the user is increased. According to another processing method, the input method is changed (for example, from a touch sensor input system to a sound or voice input system).

The following explanation is as an example of the third embodiment in which a voice is inputted. In a system in which a voice response is inputted, the absense of a response from a user of the system may occur in at least three situations, that is, ① the situation where the auditory acuity of the system user is poor, ② the situation where the system cannot receive the response from the user since the voice inputted from the user is weak, and ③ the situation where the system cannot recognize the response from the user since the response inputted by the user is vague (in pronouncing level).

In the case ②, the system gives a message informing that a replay should be made, and the sensitivity of the receiver 103 (or microphone 41) is enhanced. Thereafter, the same processing method as before is provided.

In the case ③, the system provides a processing method in which a procedure is performed through recognition of the responses "YES" and "NO" (or the presence and absence of a response) from the user. For example, in the case of inputting a secret number, the previous processing method in which the numerals are pronounced by the user is altered to a processing method in which the system makes the recognition of the secret number in accordance with the presence/absence of a response from the user, for example, a message from the system "Is the second numeral three (3)?". An identity inputting method for verifying a user's right of use of a system in order to perform a procedure desired by the user will be explained. This fourth embodiment is provided as a tactile interface by which a user lacking the visual power and the auditory power performs an interactive processing. The identity inputting method disclosed here is applicable to the other embodiments.

Figure 7A:
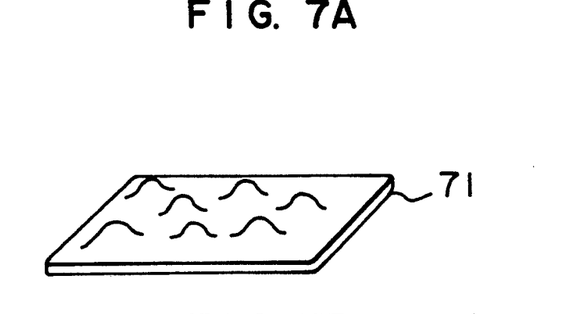
FIG. 7A is a view showing a medium used in entering a secret code for verifying a user's right of use of a system in a tactile interface and represents the fourth embodiment of the present invention.
Figure 7B:
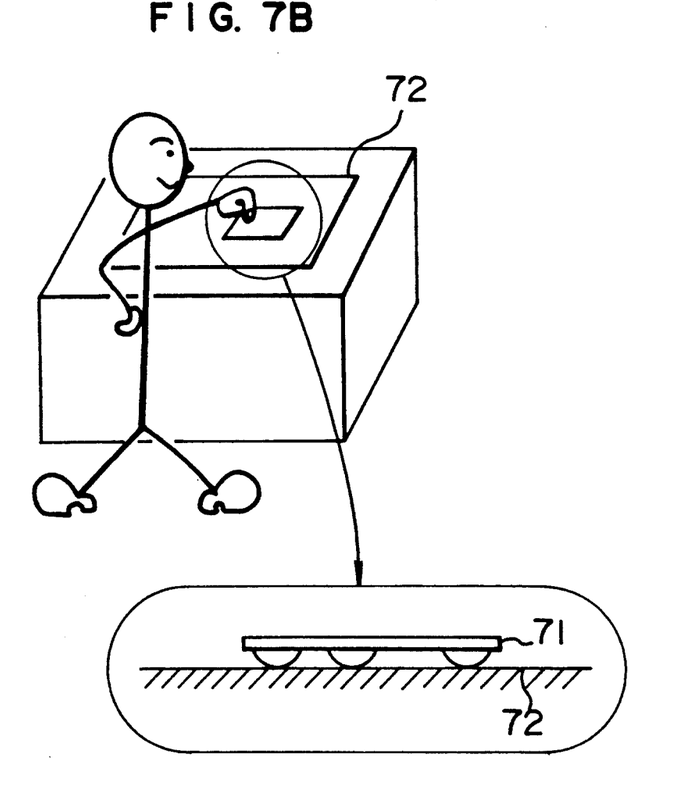
FIG. 7B is a view for explaining a method of decoding data registered in the medium shown by FIG. 7A.

FIG. 7A is a view showing a medium used to verifying a user's right of use of a system, and FIG. 7B is a view for explaining a method of inputting an identity by virtue using the medium. Reference numeral 71 designates an identity inputting medium, and numeral 72 designates a display with touch sensor for decoding the contents recorded in the medium 71. A code representative of the identity recorded in the medium 71 corresponds to the number and arrangement of projections on the medium 71.

The system user places the medium 71 on top of the display 72 and depresses the projections on the medium 71, as shown in FIG. 7B. The touch sensor on the display 72 recognizes the size of the medium 71 and senses or detects the number and arrangement of projections on the medium. Thereby, the code representative of the identity is inputted. It is assumed here that data of individuals corresponding to various codes are stored in the system. On the basis of data concerning the system user corresponding to the decoded code, the system provides an operation procedure conformable to the operating capacity of the system user. If bodily (or physical) data of the system user is not stored, the system provides an operation procedure conformable to the operating capacity of the system user by carrying out the procedure explained in the first three embodiments.

Next, an explanation of the material of the medium 71 will be made.

Figure 8:
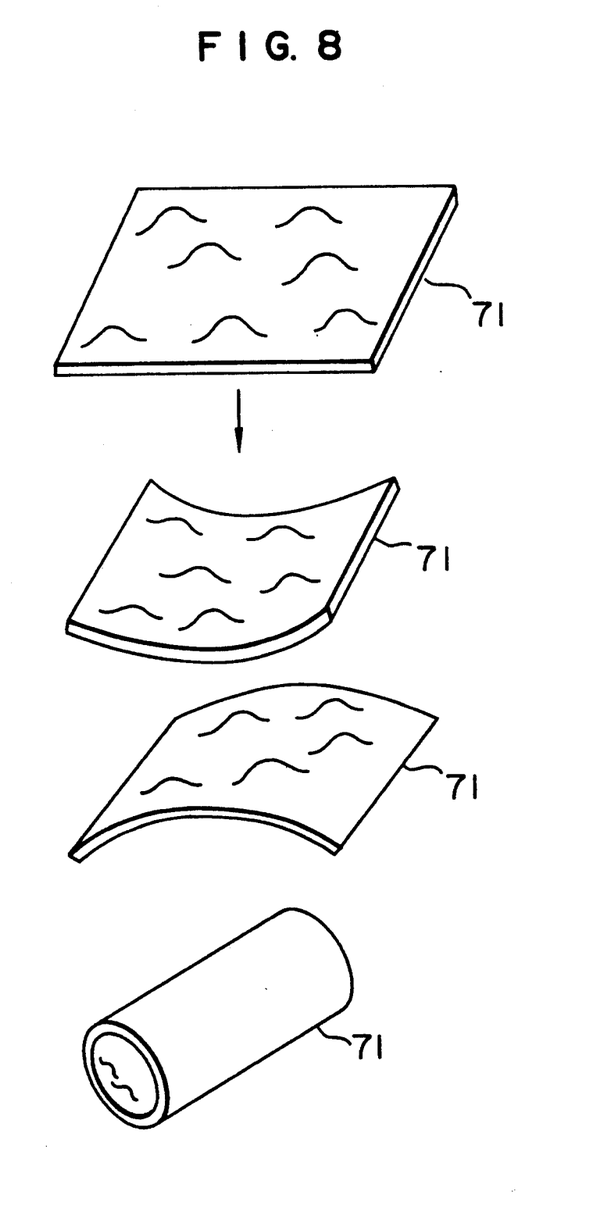
FIG. 8 is a view showing the medium shown by FIG. 7A.

Since the code recorded in the medium 71 corresponds to the number and arrangement of projections, the range of selection of the material of the medium 71 is wide. One example of the material of the medium 71 is rubber. In the case where the rubber is used as the material of the medium 71, the user can carry the medium with him in any shape depending on the carrying position thereof, as shown in FIG. 8, since the rubber has excellent flexibility.

By using the medium explained above in conjunction with the fourth embodiment, the inputting of an identity for verification of a user's right of use of a system is simplified. Also, the degree of freedom for selection of a material of the medium is increased.

The first to fourth embodiments have concerned a system in which an interactive processing is advanced in cooperation with a human. However, the system user may be a machine if the system is provided with a function of recognizing the processing capacity of the machine on the basis of a response from the machine and a function of providing a processing method conformable to the processing capacity of the machine. Thus, the system user in the present invention includes a machine as well as a human.

According to the present invention, since a system or equipment provides a procedure for use of the system conformable to a user of the system, the system user can use the system without regard to the user's particular capacity.

We claim:

1. An interactive intelligent interface for effectively exchanging information between a system and a physically impaired user whose physical impairment otherwise precludes an ability to exchange information with the system, comprising:
    means for measuring the extent of impairment of the user of the system;
    means for estimating an operating capacity of the user to communicably exchange information with the system on the basis of the measured extent of impairment;
    a plurality of means for outputting to the user information from the system;
    a plurality of means for inputting to the system information from the user; and,
    means for selecting a one of the plurality of outputting means and a one of the plurality of inputting means in accordance with the estimated capacity of the user to communicably exchange information.

2. The interactive intelligent interface according to claim 1, wherein the means for measuring the extent of impairment of the user comprises a predetermined medium.

3. The interactive intelligent interface according to claim 1, wherein the means for measuring the extent of impairment includes means for transmitting visual information.

4. The interactive intelligent interface according to claim 3, wherein the means for transmitting visual information comprises a display screen on which a symbol size is gradually increased.

5. An interactive intelligent interface according to claim 3, wherein the second kind of information is imparted by displaying a series of symbols in a visual acuity testing table on a display screen.

6. The interactive intelligent interface according to claim 1, wherein the means for measuring the extent of impairment includes means for transmitting auditory information.

7. An interactive intelligent interface according to claim 6, wherein the second kind of information is imparted by a sound the volume of which is gradually enhanced.

8. The interactive intelligent interface according to claim 1, wherein the means for measuring the extent of impairment comprises an input to a touch sensor.

9. An interactive intelligent interface according to claim 1, wherein the second kind of information is imparted by the absence of an input for a predetermined period of time.

10. The interactive intelligent interface according to claim 1, wherein the means for measuring the extent of impairment comprises an input to a handy stick transducer.

11. The interactive intelligent interface according to claim 1, wherein one of the plurality of outputting means includes means for transmitting visual information.

12. The interactive intelligent interface according to claim 11, wherein one of the plurality of outputting means include means for freezing a symbol imaged on the transmitting means.

13. The interactive intelligent interface according to claim 11, wherein a one of the plurality of outputting means include selection means for selecting a symbol from a visual acuity testing table.

14. The interactive intelligent interface according to claim 1, wherein a one of the plurality of outputting means includes means for transmitting auditory information.

15. The interactive intelligent interface according to claim 14, wherein said one of the plurality of outputting means includes means for detecting a change-over from visual information transmission to auditory information transmission.

16. The interactive intelligent interface according to claim 14, wherein said one of the plurality of outputting means includes means for sound volume selection.

17. An interactive intelligent interface between a user and an interactive system for exchanging information concerning an operation to be conducted, comprising:

plural kinds of outputting means for providing plural kinds of outputted information to the user;

plural kinds of inputting means for inputting a response of the user to outputted information from said outputting means;

means for estimating a capacity of the user to operate the system on a basis of the response of the user to said outputted information, said estimating means including:

means for providing to the user at least one of the plural kinds of outputted information through at least one of said outputting means, means for receiving a response of the user through at least one of said inputting means, and means for selectively changing from the at least one of said outputting means and/or the at least one of said inputting means to another one of said outputting means and/or another one of said inputting means in response to said response of the user; and means for selecting a successful one of said outputting means and a successful one of said inputting means to communicably exchange information between the system and user on the basis of the estimated capacity of the user.

18. An interactive intelligent interface for effectively exchanging information between a system and a physically impaired or inexperienced user whose inexperience otherwise precludes an ability to exchange information with the system, comprising:

means for measuring an extent of inexperience of the user of the system;

means for estimating an operating capacity of the user to communicably exchange information with the system on the basis of the measured extent of inexperience;

a plurality of means for outputting to the user information from the system;

a plurality of means for inputting to the system information from the user;

means for selecting one of the plurality of inputting means in accordance with the estimated capacity of the user to communicably exchange information.

19. The interactive intelligent interface of claim 18 further comprising means for selecting one of the plurality of outputting means in accordance with the estimated capacity of the user to communicably exchange information.

* * * * *